US009026312B2

(12) United States Patent  
Smith et al.

(10) Patent No.: US 9,026,312 B2  
(45) Date of Patent: May 5, 2015

(54) ERGONOMICS TEST BUCK

(75) Inventors: Todd Bartholomew Smith, Peoria, IL (US); Darin Patrick Brodie, Princeville, IL (US); David Hopp, Glen Carbon, IL (US); David Asher, Alton, IL (US); Robert Lewis, St. Louis, MO (US); Casey Boyer, Winfield, MO (US); Roberto Lanzara, St. Peters, MO (US); David Schweppe, Ballwin, MO (US); Vern Alway, Lake Sherwood, MO (US)

(73) Assignee: Caterpillar Inc., Peoria, IL (US)

( * ) Notice: Subject to any disclaimer, the term of this patent is extended or adjusted under 35 U.S.C. 154(b) by 302 days.

(21) Appl. No.: 13/597,376

(22) Filed: Aug. 29, 2012

(65) Prior Publication Data

US 2014/0060216 A1    Mar. 6, 2014

(51) Int. Cl.
| | |
|---|---|
| *G05D 1/00* | (2006.01) |
| *G09B 9/02* | (2006.01) |
| *G09B 9/04* | (2006.01) |
| *E02F 9/16* | (2006.01) |
| *E02F 9/20* | (2006.01) |

(52) U.S. Cl.  
CPC ... *E02F 9/16* (2013.01); *G09B 9/04* (2013.01); *E02F 9/2004* (2013.01)

(58) Field of Classification Search  
CPC ..... G05G 9/047; G05G 9/04737; G09B 9/00; G09B 9/04; G09B 9/02; G09B 9/05; G09B 9/12; G09B 9/14; G09B 9/048; G09B 25/00; G09B 25/02; G06F 2203/015

USPC ......... 434/62, 29, 67, 55, 58, 69, 373, 63, 71; 701/49, 1, 41; 73/865.3

See application file for complete search history.

(56) References Cited

U.S. PATENT DOCUMENTS

| | | | |
|---|---|---|---|
| 4,773,261 A | 9/1988 | Cantrell | |
| 5,121,889 A * | 6/1992 | Carey, Jr. | 244/234 |
| 5,431,569 A * | 7/1995 | Simpkins et al. | 434/29 |
| 5,618,995 A * | 4/1997 | Otto et al. | 73/669 |
| 5,865,624 A * | 2/1999 | Hayashigawa | 434/66 |
| 6,324,750 B1 | 12/2001 | Saunders et al. | |
| 6,371,766 B1 | 4/2002 | Doll et al. | |
| 6,431,304 B1 * | 8/2002 | Smythe | 180/334 |
| 6,553,298 B2 | 4/2003 | Smythe | |
| 6,681,880 B2 | 1/2004 | Bernhardt et al. | |
| 6,857,498 B2 * | 2/2005 | Vitale et al. | 180/326 |
| 7,662,042 B2 * | 2/2010 | Oswald | 463/46 |

(Continued)

FOREIGN PATENT DOCUMENTS

| | | |
|---|---|---|
| JP | 2001-209447 | 8/2001 |
| JP | 2004-252024 | 9/2004 |

*Primary Examiner* — Lisa Caputo  
*Assistant Examiner* — Jonathan Dunlap  
(74) *Attorney, Agent, or Firm* — Miller, Matthias & Hull LLP

(57) ABSTRACT

A test buck, a test buck system and related method are disclosed. The test buck system may comprise a controller and a test buck. The test buck may include a portable bed, a seat module mounted to the bed, and a first OIM disposed on the bed. At least a portion of the first OIM may be selectively moveable in at least four degrees of freedom, up to six degrees of freedom. The controller may be electrically connected to a first Operator Interface Module (OIM). The controller may be configured to selectively move at least a portion of the first OIM in at least four to six degrees of freedom.

18 Claims, 10 Drawing Sheets

(56) References Cited

U.S. PATENT DOCUMENTS

| | | | |
|---|---|---|---|
| 2002/0117017 A1* | 8/2002 | Bernhardt et al. | 74/471 XY |
| 2003/0180693 A1* | 9/2003 | Mulder et al. | 434/58 |
| 2004/0259059 A1* | 12/2004 | Aoki et al. | 434/61 |
| 2006/0229770 A1 | 10/2006 | Strong | |
| 2007/0218427 A1* | 9/2007 | Lefton | 434/29 |
| 2007/0269771 A1* | 11/2007 | Lefton | 434/29 |
| 2009/0048742 A1 | 2/2009 | Kiridena et al. | |
| 2009/0163283 A1* | 6/2009 | Childress | 463/47 |
| 2011/0192240 A1 | 8/2011 | Kruse | |
| 2012/0301853 A1* | 11/2012 | Garvis et al. | 434/58 |
| 2014/0087334 A1* | 3/2014 | Schlusselberger | 434/29 |

\* cited by examiner

ERGONOMICS TEST BUCK

TECHNICAL FIELD

The present disclosure generally relates to test bucks for use in the design of ergonomic operator interface configurations within vehicles and, more particularly, with the cabs of vehicles used in earth moving, construction, material handling, mining applications, and the like.

BACKGROUND

There are many different operator interfaces in the cabs of modern work machines. Each operator interface may require a range of motions by the operator of the work machine. Optimal placement of the operator interfaces in the machine cab may increase the operator's ease of use, efficiency and overall satisfaction with the work machine. In the past, placement of the operator interfaces within the cab was often completed after prototypes of the machine were built due to the difficulty in determining the effect of dynamic machine motion on operator posture, and the resultant preferred locations of the interfaces. Changes in operator interface placement, particularly operator controls, at the prototype stage may be costly and difficult, since moving an operator interface may interfere with the placement of other aspects of the vehicle.

U.S. Pat. No. 6,371,766 issued Apr. 16, 2002 (the '766 patent) discloses a simulated vehicle, including body panels and vehicle components mounted on support structures for dimensional adjustment in the fore/aft, up/down and lateral directions to form a variety of different spatial relationships between the vehicle components. As shown in FIG. 2 of the '766 patent, this simulated vehicle includes a platform of interconnected steel tubes upon which the vehicle components are mounted. This type of test buck has some drawbacks because, for example, it is only designed to test component movement in three degrees of freedom (fore/aft, up/down and lateral directions) during static testing. A better test buck is needed to optimize operator control positioning.

SUMMARY OF THE DISCLOSURE

In accordance with one aspect of the disclosure, a test buck system is disclosed. The test buck system may comprise a controller and a test buck. The test buck may include a portable bed, a seat module mounted to the bed, and a first Operator Interface Module (OIM) disposed on the bed. At least a portion of the first OIM may be selectively moveable in four degrees of freedom. The controller may be electrically connected to the first OIM. The controller may be configured to selectively move at least a portion of the first OIM in four degrees of freedom.

In accordance with another aspect of the disclosure, a test buck system is disclosed. The test buck system may comprise a bed, a seat module mounted to the bed, a controller and an OIM mounted to the bed. The bed may be configured to be removeably mounted to a test floor of a dynamic ride simulator. The OIM may have a first portion. The controller may be electrically connected to the OIM. The controller may be configured to selectively move at least a portion of the OIM in the range of four to six degrees of freedom.

In accordance with a further aspect of the disclosure, a method of determining a desired position of at least one OIM. The method may comprise simulating a machine operation while one of a plurality of operators is disposed in a seat module mounted to a bed and is operating a first OIM mounted to the bed and disposed in a home position. The method may further comprise moving the first OIM to a final position in response to adjustment input from the operator, generating a set of final test positions for the OIM by performing the simulating and moving steps for each of the plurality of operators, and defining a desired operational range of adjustability and a desired operational position for the OIM based on the set of final test positions. At least one final test position in the set of final test positions may be different from the home position by four degrees of freedom.

DETAILED DESCRIPTION

Figure 1:
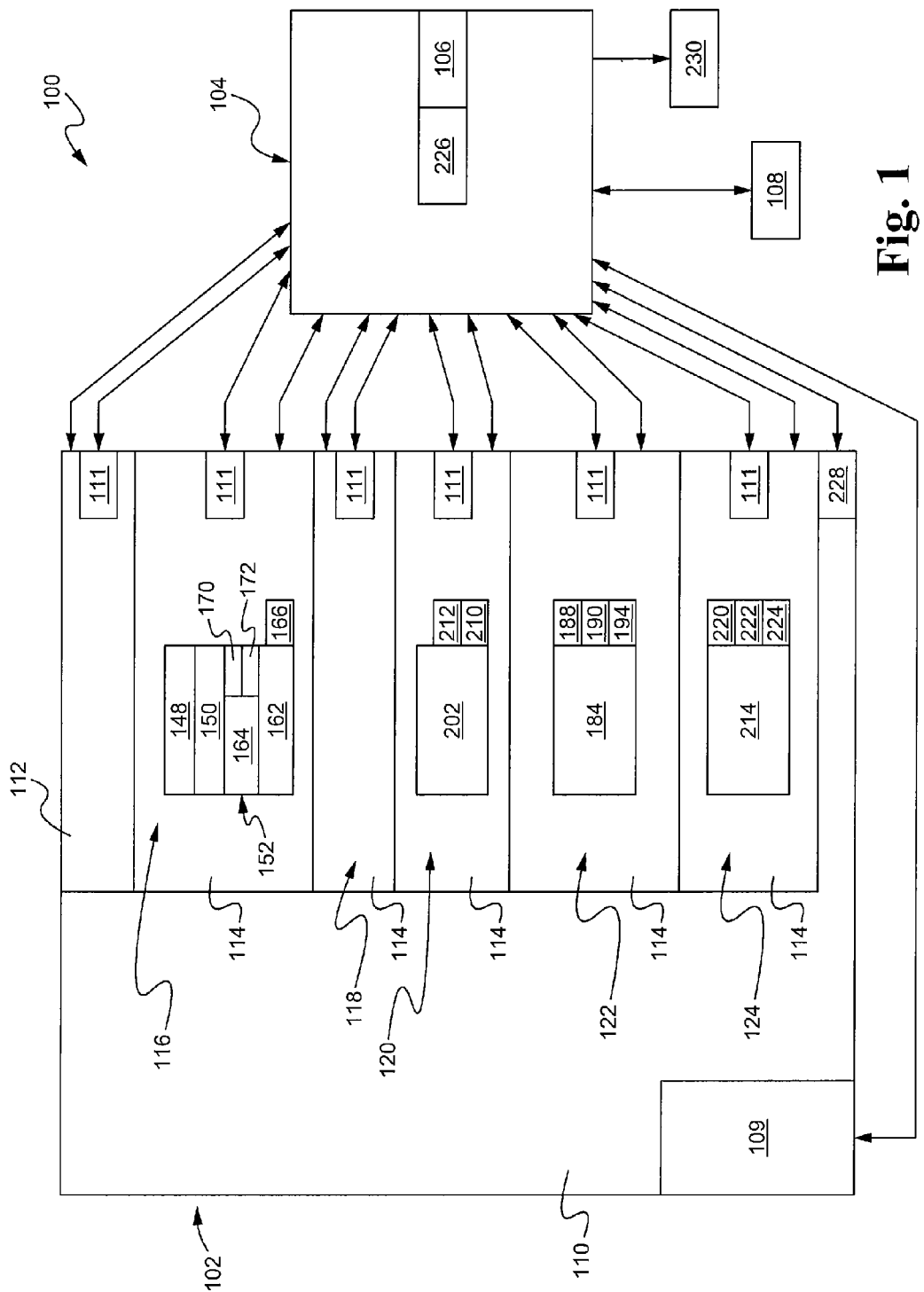
FIG. 1 is a general schematic view of an exemplary embodiment of an ergonomic test buck system constructed in accordance with the teachings of this disclosure.

Referring now to the drawings, and with specific reference to FIG. 1, there is shown a test buck system in accordance with the present disclosure and generally referred to by reference numeral 100. The test buck system 100 comprises a portable test buck 102 and a controller 104. In some embodiments, the test buck system 100 may also include a remote operator interface 108 connected to the controller 104. In yet another embodiment, the test buck system may include a user interface 109 disposed on the test buck 102.

The test buck 102 may comprise a bed 110, a seat module 112 and one or more OIMs 114. In an embodiment of the test buck 102, the bed 110 may serve as the primary structure upon which the seat module 112 and the OIMs 114 may be mounted. The test buck 102 may, in some embodiments, only include one OIM 114 and, in other embodiments, the test buck 102 may include a plurality of OIMs 114. The OIMs 114 may include an upper control module 116, an armrest module 118, a steering module 120, a foot control module 122 and a display module 124. The test buck may also include sensors 111, as are known in the art, that are configured to provide data to the controller 104 related to the position of various moveable components of the seat module 112 and OIM(s) 114.

Figure 2:
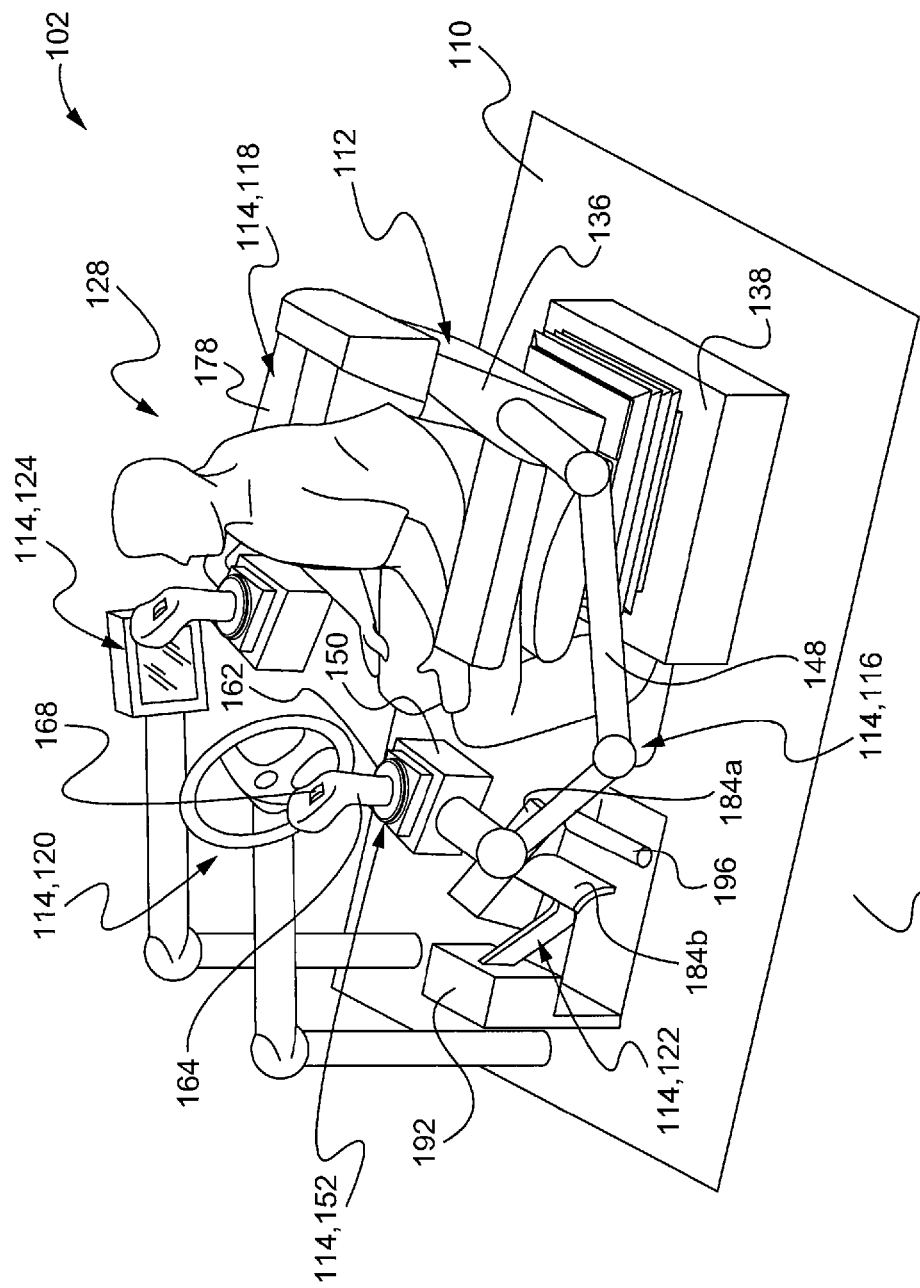
FIG. 2 is perspective view of an embodiment of an exemplary embodiment of a test buck constructed in accordance with the teachings of this disclosure.

FIG. 2 illustrates one embodiment of the test buck 102 with a variety of OIMs 114 mounted on the bed 110. In some embodiments, the controller 104 and the memory component 106 may also be mounted on the bed 110. The bed 110 may be portable and configured to be removeably secured to a floor of a test environment or a motion platform of a dynamic ride simulator.

Figure 3A:
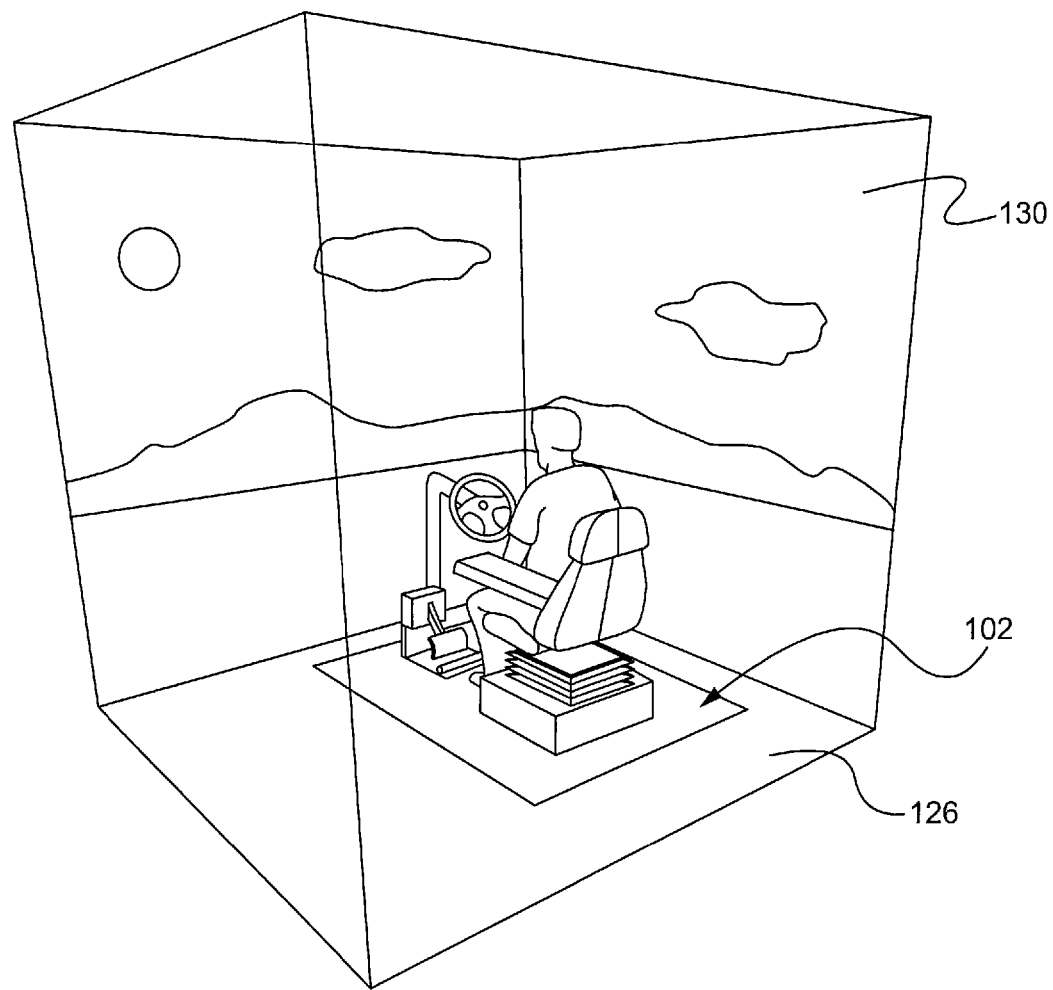
FIG. 3A-B are illustrations of other exemplary environments in which the test buck may be utilized.

FIG. 2 illustrates an embodiment of the test buck 102 mounted to the floor 126 in a lab setting 128. FIG. 3A illustrates an embodiment of the test buck 102 mounted to the floor 126 of a cave automatic virtual environment (CAVE) 130, or the like. A CAVE, as is known in art, may be a virtual reality environment where projectors are directed to multiple walls of a room to simulate a desired dynamic environment, in this case a work environment for a machine. For example, in one embodiment the simulated CAVE environment could be a rough terrain area to be excavated.

Figure 3B:
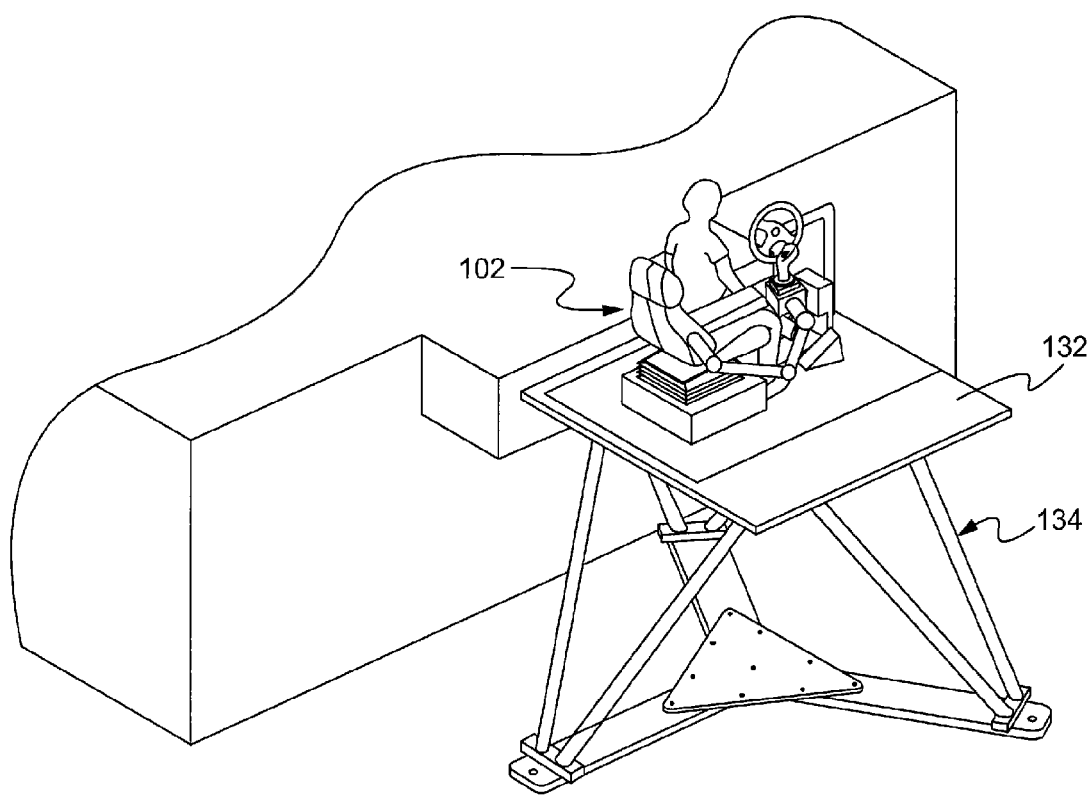

FIG. 3B illustrates an embodiment of the test buck 102 mounted to a human-rated platform 132 of a dynamic ride simulator 134. Such a human-rated platform 132 is a platform of a ride simulator 134 on which a human may ride during a ride simulation. In one exemplary ride simulator 134, the platform 132 and the test buck 102 mounted on it may experience linear displacement values of about +/−0.38 m during surging and swaying, about +/−0.33 m during heaving of the platform 132, and angular displacement values of about +/−15° during rolling and pitching of the platform 132 and about +/−18° during yawing of the platform 132. The platform 132 and the test buck 102 mounted on it may also experience velocity changes of about +/−1.6 m/s during surging and swaying, about +/−0.33 m/s during heaving, about +/−60°/s during rolling and pitching of the platform 132, and about +/−70°/s during yawing. The platform 132 and the test buck 102 mounted to it may experience acceleration changes of about +/−13 m/s$^2$ during surging and swaying, about +/−22 m/s$^2$ during heaving, about +/−530°/s$^2$ during rolling, about +/−500°/s$^2$ during pitching of the platform 132, and about +/−900°/s$^2$ during yawing. Other displacement, velocity, and acceleration values are contemplated and may be experienced by the test buck 102 during use with dynamic ride simulators 134.

The bed 110 may be configured to receive one or more OIMs 114. In one embodiment the bed 110 may be generally flat and plate shaped and configured to be removeably secured to the floor 126 or platform 132 of the test environment. For example, the bed 110 may be bolted to the floor 126 or platform 132. The bed 110 is not limited to being flat or plate-like. The bed 110 may be other appropriate shapes and geometries. For example, the bed 110 may have a stair-step geometry.

The seat module 112 may be mounted to the bed 110. As illustrated in FIG. 2, the seat module 112 may comprise a seat 136 mounted on a riser 138. The riser 138 may be secured to the bed 110. The seat 136 may be configured to receive a seated evaluator. The evaluator may be a person that manipulates, either directly or indirectly, the position, namely the location and orientation of one or more OIM 114(s) and/or the position, namely the location and orientation of the seat 136.

Figure 4:
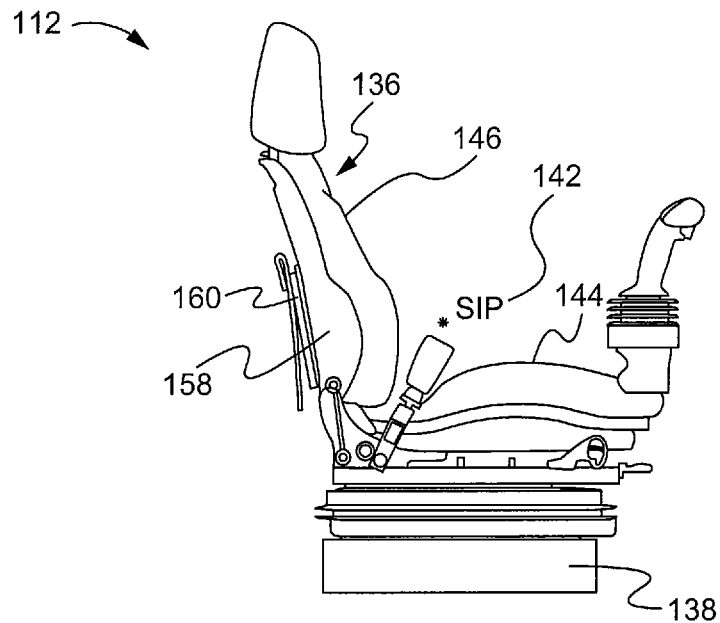
FIG. 4 is a side view of an embodiment seat module and an exemplary SIP.
Figure 10:
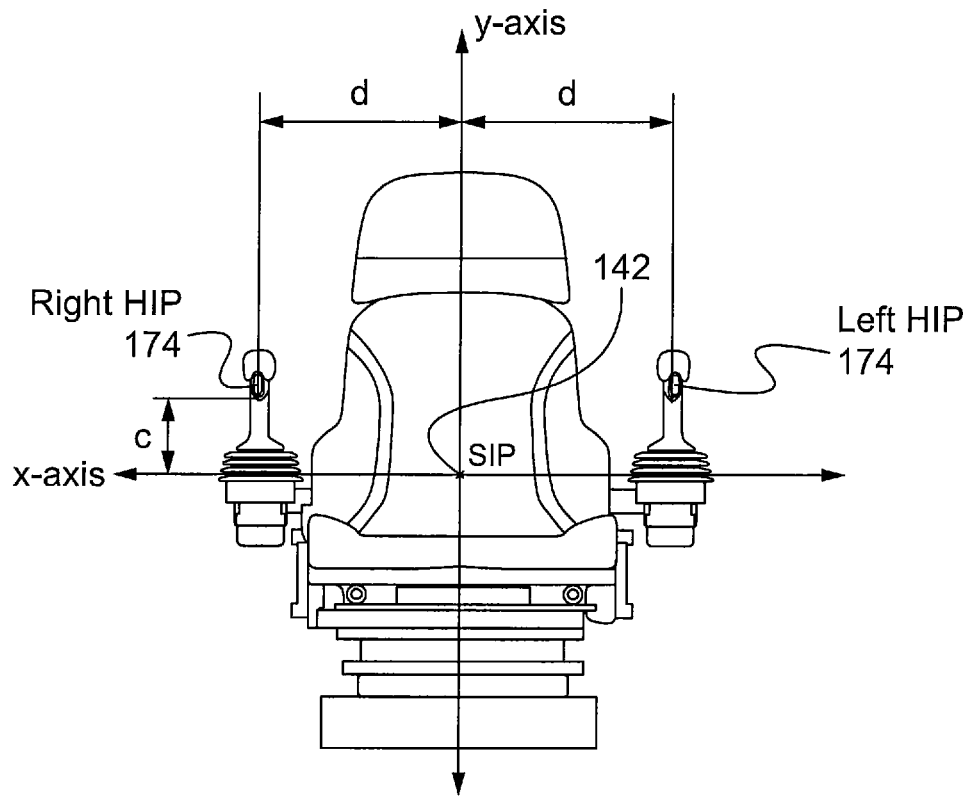
FIG. 10 is a front view of an embodiment of the seat module and the hand control apparatus and exemplary HIP and SIP in accordance with the teachings of this disclosure.

The geometry of the seat 136 may define a seat index point (SIP) 142, such as illustrated in FIGS. 4 and 10. The SIP 142 is a reference point relative to the seat geometry that represents the intersection of a vertical plane and a theoretical pivot axis between a human torso and thighs when the human is seated in the seat 136. The vertical plane extends through the center of the seat 136, that is, the vertical plane extends through the center of the chair 144 and the back 146 of the seat 136 effectively "cutting" the seat 136 into halves. A portion of the upper control module 116 has been removed in the illustration shown in FIGS. 4 and 10 to better illustrate the aforementioned description.

The seat 136 may be configured to be adjustable and, as such, may provide for movement in one or more degrees of freedom. Thus, the evaluator may, in some embodiments, be able to manipulate either directly or indirectly the seat 136 of the seat module 112.

Figure 5:
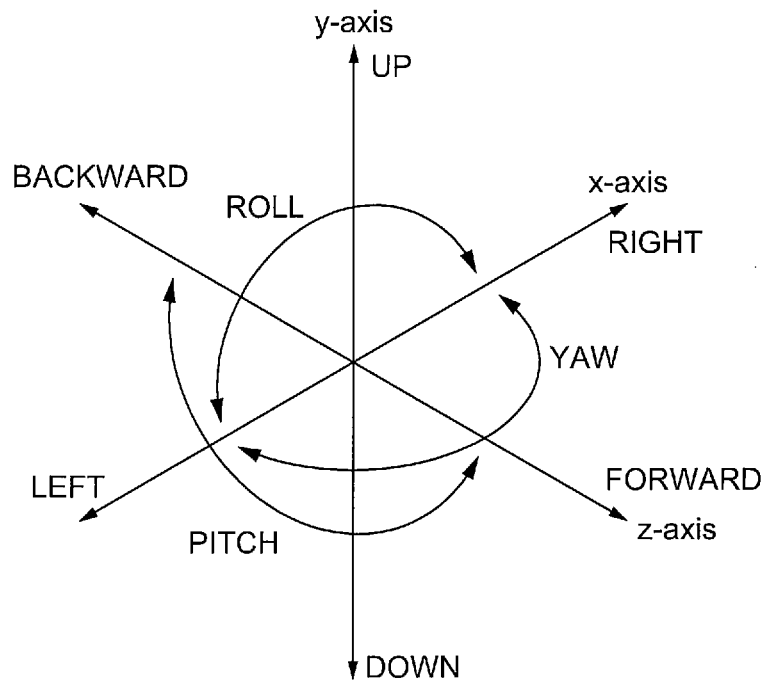
FIG. 5 schematic view of the degrees of freedom.

For the purposes of this disclosure, the term "degree(s) of freedom" refers to the motion of a rigid body in three dimensional space. FIG. 5 illustrates six exemplary degrees of freedom of movement: translation along each of three perpendicular axes in the longitudinal (forward/backward along the z-axis), vertical (up/down along the y-axis), or lateral (left/right along the x-axis) directions, and rotation about these perpendicular axes in the pitch, yaw or roll directions. Movement in any one of these directions represents movement in one degree of freedom. For example, a body that moves in any four of these directions would have four degrees of freedom of movement. A body that can move in the forward/backward, up/down, and right/left directions and also in the pitch, yaw or roll rotational directions has six degrees of freedom of movement.

In one embodiment the seat 136 may be fixed in one position with no freedom of movement. In another embodiment, the seat 136 may be adjustable in one, two or three degrees of freedom of movement. For example, the seat 136 may be moveable in the forward/backward direction, up/down direction, the yaw direction or any combination of these degrees of freedom of movement.

FIG. 2 illustrates an embodiment of the upper control module 116. In an embodiment of the test buck 102, the test buck 102 may include one or more upper control modules. In one embodiment the upper control module 116 includes an arm 148, a wrist 150 and a hand control apparatus 152.

The upper control module 116 may be lightweight. In an embodiment, the weight of the upper control module 116, with the exception of the hand control apparatus 152, may be in the range of about 5 kg to about 26 kg, plus or minus a 10% deviation. In another embodiment, the weight of the upper control module 116, with the exception of the hand control apparatus 152, may be in the range of about 10 kg to about 20 kg, plus or minus a 10% deviation. In yet another embodiment, the upper control module 116, with the exception of the hand control apparatus 152, may be in the range of about 10 kg to about 15 kg, plus or minus a 10% deviation.

In an embodiment, the upper control module 116 is not only lightweight, but is strong enough to be able to "hold a position" when used during ride simulation in a lab setting, in a CAVE, or on a motion platform 132 of a dynamic ride simulator 134 (during dynamic ride simulation). For the purpose of this disclosure, the phrase "holding a position" refers to the ability of an OIM 114 to remain in about the same position during ride simulation. In one embodiment, the upper control module 116 may hold a position when subjected to a range of vector acceleration, commonly referred to as g-force, of about −6 g to about 6 g, plus or minus 10% deviation. One g is the acceleration due to gravity at the Earth's surface and is the standard gravity defined as 9.80665 meters per second squared or equivalently 9.80665 Newtons of force per kilogram of mass. In another embodiment, the upper control module 116 may hold a position when subjected to a range of g-force, of about −3 g to about 3 g, plus or minus 10% deviation. In yet another embodiment, the upper control module 116 may hold a position when subjected to a range of g-force of about −2 g to about 2 g, plus or minus 10% deviation. In another embodiment, the upper control module 116 may hold a position when subjected to a range of g-force of about −1 g to about 1 g, plus or minus 10% deviation.

Figure 7:
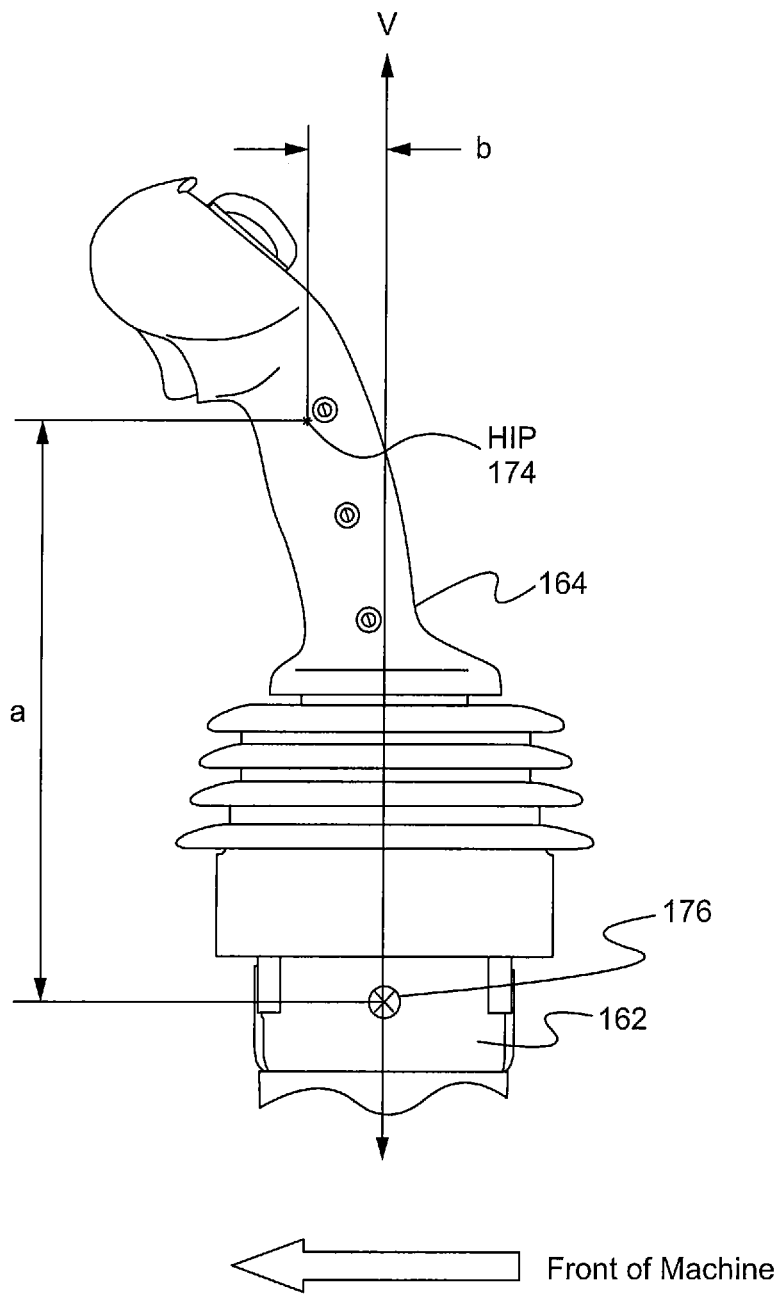
FIG. 7 is a side view of the hand control apparatus and an exemplary HIP.

The upper control module 116 may be configured to be adjustable (move) in multiple degrees of freedom of movement. The upper control module 116 may move in any one of or any combination of the following degrees of freedom of movement: forward/backward, up/down, right/left, pitch, yaw or roll. Such movement helps define the contours of the adjustment envelope 156 of the upper control module 116. For the purpose of this disclosure, the term adjustment envelope means the range of adjustability. The adjustment envelope 156 of the upper control module 116 is located relative to a reference point (in one embodiment, the reference point may be the SIP 142) and is the three dimensional space within which the upper control module 116 is able to position the Hand Index Point (HIP) 174 (as defined later) of the hand control apparatus 152 (FIGS. 2 and 7)

Figure 6:
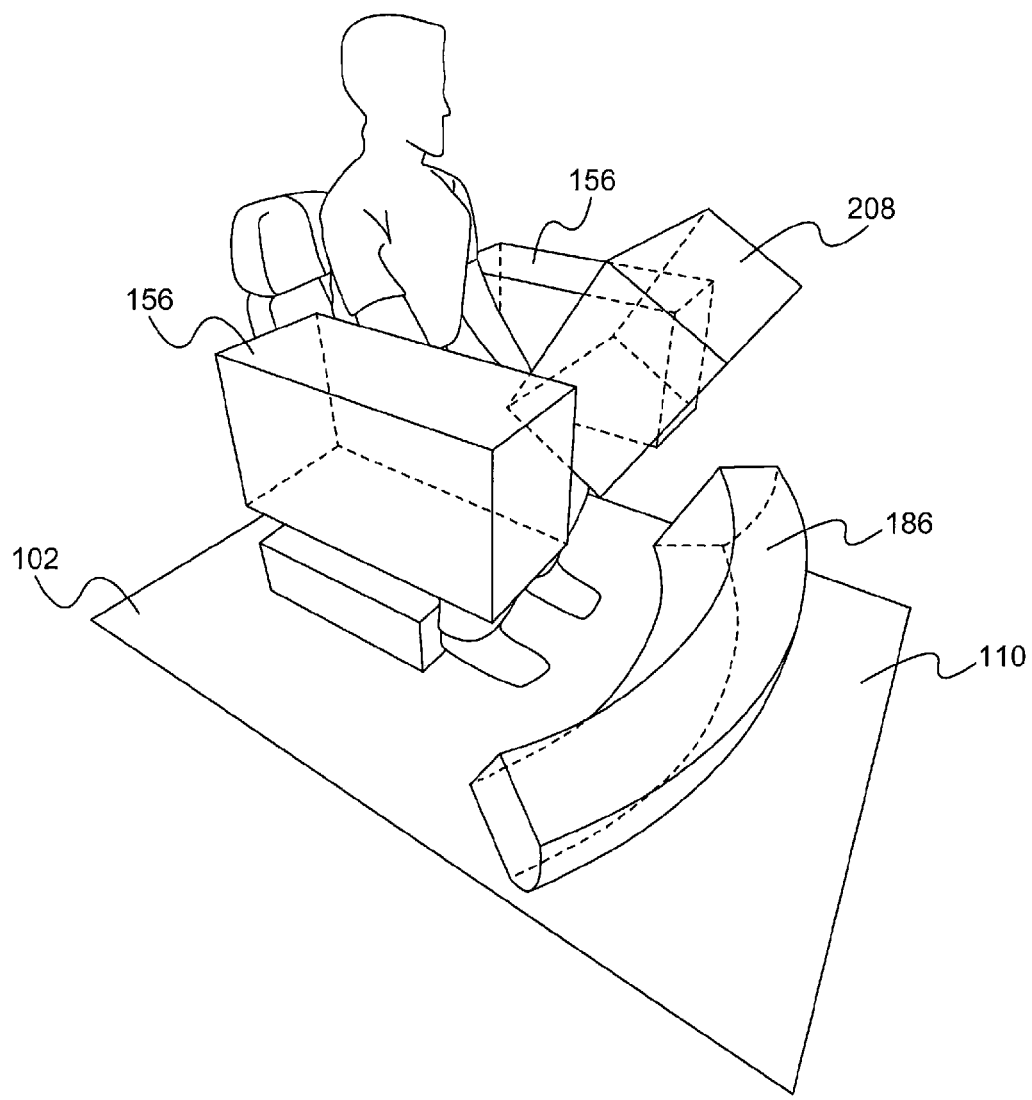
FIG. 6 is a view of exemplary embodiments of the adjustment envelopes for the upper control module, the pedal and the steering module.

In one embodiment, the upper control module 116 may provide movement in all six of the aforementioned degrees of freedom and may have an upper control module adjustment envelope 156 in the forward/backward directions of about 0 mm to about 800 mm, in the up/down directions in the range of about −100 mm to about 400 mm, in the left/right directions in the range of about −100 mm to about 500 mm, in the pitch direction of about +15° to about −60°, in the yaw range of about −60° to about +60°, and in the roll direction of about −15° to about 105° if the arm 148 of the upper control module 116 is mounted so that the arm 148 is disposed on the left side of a seated evaluator and a roll range of +15° to about −105° if the arm 148 of the upper control module 116 is mounted so that the arm 148 is disposed on the right side of the seated evaluator. The pitch, yaw and roll ranges are measured from the generally vertical orientation of the handle 164 of the hand control apparatus 152. FIG. 6 illustrates one embodiment of an adjustment envelope 165 of the upper control module 116.

The arm 148 (FIG. 2) of the upper control module 116 may be mounted to a side 158 of the seat module 112 or may be mounted to the back 160 of the seat 136 or riser 138. Alternatively, the arm 148 may be mounted to the bed 110. The arm 148 may be configured to be adjustable (move) in any one of or any combination of the following degrees of freedom: forward/backward, up/down, and right/left. The arm may be a robotic arm, or the like.

The wrist 150 of the upper control module 116 is disposed between the arm 148 and the hand control apparatus 152. The wrist 150 may be mounted on the arm 148 and may be configured to be adjustable (move) in any one of or any combination of the following degrees of freedom: pitch, yaw or roll rotational directions. In one embodiment, the wrist 150 may be comprised of a set of three gimbals that together allow movement in three degrees of freedom (as is known in the art), namely the pitch, yaw and roll rotational directions around three perpendicular axes.

The hand control apparatus 152 may be mounted on the wrist 150. The hand control apparatus 152 may be lightweight. For example, in one embodiment, the weight of the hand control apparatus may be in the range of about 2 kg to about 10 kg, plus or minus a 10% deviation. In another embodiment, the weight of the hand control apparatus may be in the range of about 4 kg to about 7 kg, plus or minus a 10% deviation.

The hand control apparatus 152 may comprise a base 162 mounted to the wrist 150, and a handle 164 releaseably attached to the base 162. In one exemplary embodiment, the hand control apparatus 152 may be a joystick and the handle 164 may pivot upon the base 162. The base 162 may be configured to releaseably secure the handle 164 to the base 162 such that the handle 164 is held securely to the base 162 during use by an evaluator but may be detached and replaced with a different handle 164. The hand control apparatus 152 may also include an adjuster 166 (FIG. 1). Such an adjuster 166 may be, but is not limited to, buttons, switches, dials or the like.

The handle 164 (FIGS. 1, 2 and 7) may have a lever-like generally elongated shape, although other shapes are also possible. The handle 164 may be configured to be detachable from the base 162 such that the same base 162 may be utilized with various different interchangeable handles 164. The handle 164 may include operator control features 168. For example, the handle 164 may include buttons, switches, rotatable members, slidable members, or the like. The handle 164 may include a portion with a handgrip or shape that is comfortable for a user to grasp with a hand. The hand control apparatus 152 may include handle stops 170 and detents 172 between each handle stop 170. Such a handle stop 170 may position or hold the handle 164 such that the handle 164 may be released when force is applied. A handle detent 172 occurs between handle stops 170 and provides resistance to handle 164 movement that may be overcome when force is applied. However, with a handle detent 172 less force may be required than that to overcome a handle stop 170. In one embodiment the handle stop 170 or detent 172 may be a mechanical component that utilizes spring force. In another embodiment, the handle stop 170 or detent 172 may be a resistive actuator controlled electronically by a controller.

The geometry of the hand control apparatus 152 may define the HIP 174. As seen in the exemplary hand control apparatus 152 illustrated in FIG. 7, the HIP 174 is a reference point relative to the geometry of the handle 164 that represents the centroid of a user's hand when grasping the handle 164. In the embodiment illustrated in FIG. 7, the HIP 174 is distance "a" above the handle pivot point 176 and offset a distance "b" in front of a vertical axis, V, intersecting the handle pivot point 176. In one embodiment, the distance a is about 189.73 mm and the distance b is about 26.25 mm. The HIP location may vary with different handle geometries.

The hand control adjuster 166 may be mounted to the base 162 and may be manipulated by a user to adjust the travel of the handle 164, the effort or force required to pivot the handle 164, the number of stops 170 (see FIG. 1) for the handle 164 and the number of detents 172 between stops 170. In an embodiment, where the handle 164 is a joystick pivotable about the pivot point 176 (FIG. 7), the adjuster 166 (FIG. 1) may adjust the travel of the handle 164 by increasing or decreasing the amount of degrees that the handle 164 is permitted pivot on the base 162 (FIG. 7). For example, an evaluator may change the maximum allowable pivot of a joystick handle from 85° to 35°. In another embodiment, an evaluator may also adjust the amount of travel between handle stops 170 and detents 172.

The evaluator may adjust the effort or the amount of force required for a user to move the handle 164. For example, the evaluator may change the amount of effort to move the handle 164 from about 0.5 N to about 1 N.

The evaluator may also adjust the number of stops 170 for the handle 164. For example, in an embodiment, the evaluator may adjust the number of handle stops 170 from two to three stops. The evaluator may also adjust the number of intermediate detents 172 between handle stops 170.

FIG. 2 illustrates one embodiment of the armrest module 118. The armrest module 118 may be mounted to the seat module 112. The armrest module 118 may comprise an armrest 178. In one embodiment of the armrest module 118, the armrest 178 may move in tandem with the handle 164 of the hand control apparatus 152. In another embodiment, the armrest 178 may move in tandem with the arm 148 of the upper control module 116. In yet another embodiment, the armrest 178 may move independently of the handle 164.

The armrest module 118 may be lightweight and yet can hold a position during ride simulation in a lab setting, in a CAVE setting or on a motion platform 132 of a dynamic ride simulator 134 (during dynamic ride simulation). In an embodiment, the weight of the armrest module may be in the range of 0.5 kg to about 5 kg and may be configured to support a static load in the range of 0 kg to about 137 kg of static load.

The armrest module 118 may be configured to hold a position when subjected to a range of vector acceleration (g-force). In an embodiment, the armrest module 118 may hold a position when subjected to a range of g-force of about −6 g to about 6 g, plus or minus 10% deviation. In another embodiment, the armrest module 118 may hold a position when subjected to a range of g-force of about −3 g to about 3 g, plus or minus 10% deviation. In another embodiment, the armrest module 118 may hold a position when subjected to a range of g-force of about −2 g to about 2 g, plus or minus 10% deviation. In another embodiment, the armrest module 118 may hold a position when subjected to a range of g-force of about −1 g to about 1 g, plus or minus 10% deviation.

Figure 8:
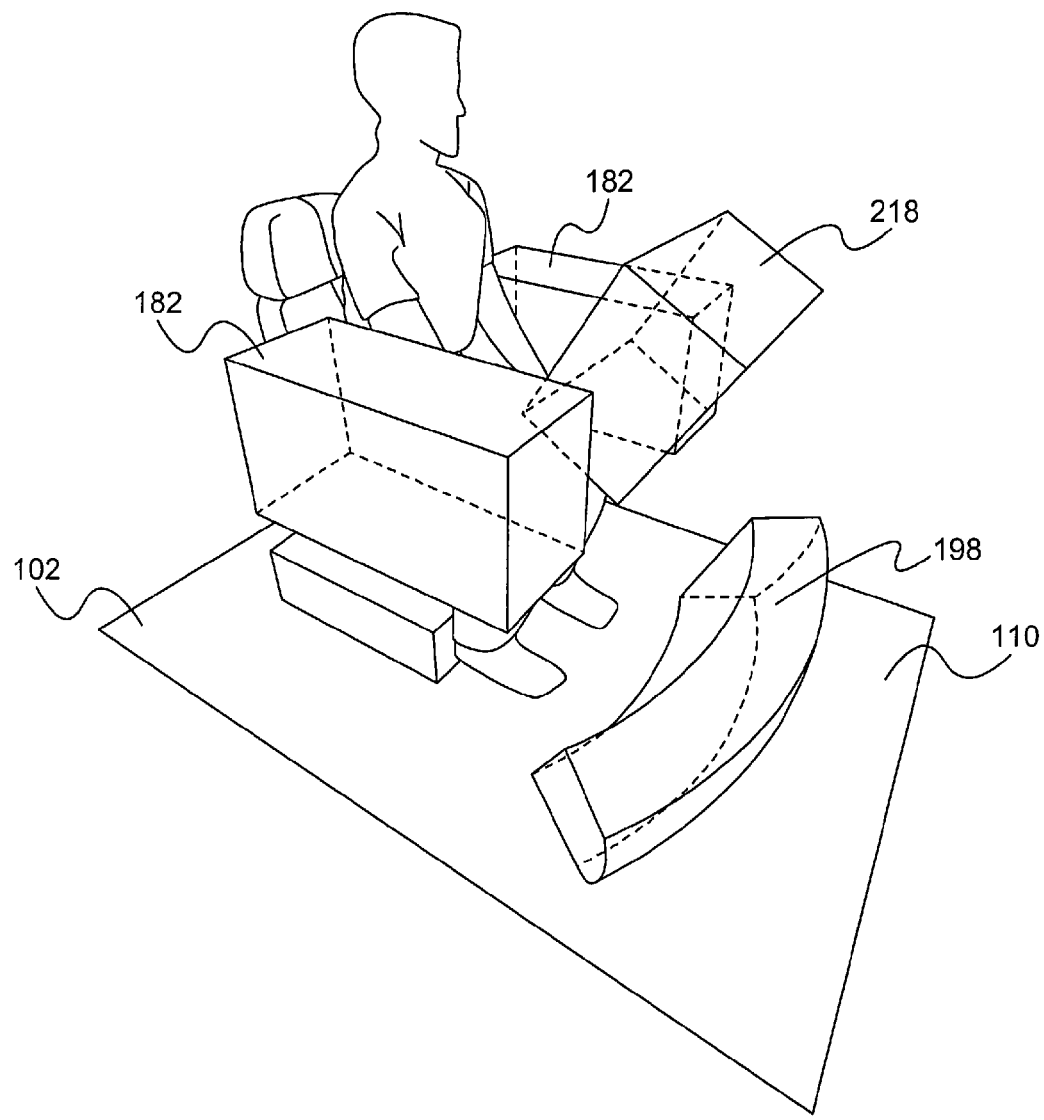
FIG. 8 is a view of exemplary embodiments of the adjustment envelopes for the armrest module, foot peg and display module.

The armrest module 118 may be configured to be moveable in multiple degrees of freedom of movement. The armrest module 118 may be configured to be adjustable (move) in any one of or any combination of the following degrees of freedom: forward/backward, up/down, right/left, pitch, yaw or roll. Such movement helps define the contours of the adjustment envelope 182 of the armrest 118. The armrest adjustment envelope 182 is located relative to a reference point and is the three dimensional space within which the armrest module 118 is able to position the centroid of the armrest 178. The reference point may be the SIP 142. FIG. 8 illustrates an exemplary armrest adjustment envelope 182.

In one embodiment, the armrest module 118 may be moveable in all six of the aforementioned degrees of freedom and may have an armrest adjustment envelope 182 in the forward/backward directions of about 0 mm to about 400 mm, in the up/down directions in the range of about 0 mm to about 150 mm, in the left/right directions in the range of about 80 mm to about 280 mm, in the pitch direction in the range of about +40° to about −40°, in the yaw range of about +40° to about −40° and in the roll direction of about +40° to about −40° if the armrest module 118 is mounted so that the armrest 178 is disposed on the left hand side of a seated evaluator and a roll range of +40° to about −40° if the armrest module 118 is mounted so that the armrest 178 is disposed on the right hand side of the seated evaluator. The pitch, yaw and roll ranges are measured from a vertical orientation.

FIGS. 1-2 illustrate exemplary embodiments of the foot control module 122. The foot control module 122 is configured to be able to "hold a position" during ride simulation in a lab setting, a CAVE or on a motion platform 132 of a dynamic ride simulator 134 (during dynamic ride simulation). In one embodiment, the foot control module 122 may hold a position within a range of about −6 g to about 6 g, plus or minus 10% deviation. In another embodiment, the foot control module may hold a position within a range of about −3 g to about 3 g, plus or minus 10% deviation. In yet another embodiment, the foot control module may hold a position within a range of g-force of about −2 g to about 2 g, plus or minus 10% deviation. In another embodiment, the foot control module may hold a position in a range of g-force of about −1 g to about 1 g, plus or minus 10% deviation.

In an embodiment the foot control module 122 may comprise a pedal 184. The foot control module 122 may be lightweight. In one embodiment, the pedal may weigh between about 1 kg to about 10 kg. Other ranges of weight are also contemplated. The pedal 184 may be a depressible pedal operated by applying pressure.

The pedal 184 may be configured to be adjustable (move) in any one of, or any combination of, the following degrees of freedom: forward/backward, up/down, right/left, pitch, yaw or roll. Such movement helps define the contours of the adjustment envelope 186 of the pedal 118. The adjustment envelope 186 of the pedal 184 may be located relative to a reference point and is the three dimensional space within which the foot control module 122 is able to position the centroid of the pedal 184. In one embodiment, the reference point may be the SIP 142. FIG. 6 illustrates an exemplary adjustment envelope 186 of the pedal 118.

The foot control module 122 may also include pedal stops 188 and pedal detents 190 between each pedal stop 188. The pedal stop 188 may position or hold the pedal 184 such that the pedal 184 may be released when force is applied. Similar to a stop 188, a pedal detent 190 may also position or hold the pedal 184 such that the pedal 184 may be released when force is applied. However, with a pedal detent 190 less force may be required than that to overcome a pedal stop 188. In one embodiment the pedal stop 188 or detent 190 may be a mechanical component that utilizes spring force. In another embodiment, the stop 188 or detent 190 may be a resistive actuator controlled electronically by a controller.

FIG. 2 illustrates two different embodiments of the foot control module 122. As shown in FIG. 2, the pedal 184a may be mounted to the bed 110. In an exemplary embodiment, the pedal 184a may move in all six of the aforementioned degrees of freedom and may have a pedal adjustment envelope 186 in the forward/backward directions of about 500 mm to about 900 mm, in the up/down directions in the range of about −200 mm to about −600 mm, in the left/right directions in the range of about −400 mm to about +400 mm, in the pitch direction in the range of about −90° to about +90°, in the yaw range of about −40° to about +40° and in the roll direction of about −20° to about +20° if the foot control module 122 is mounted so that the pedal 184a is disposed near the left hand side of a seated evaluator and a roll range of about +20° to about −20° if the foot control module 122 is mounted so that the pedal 184a is disposed near the right hand side of the seated evaluator. The pitch, yaw and roll ranges are measured from a vertical orientation.

Alternatively, as shown in the second embodiment of the foot control module 122 illustrated in FIG. 2, the pedal 184b may be suspended on a tower 192 secured to the bed 110. The pedal 184b may be releasably attached to the tower 192 so as to be securely mounted to the tower 192 during use but interchangeable with other pedals 184. In one exemplary embodiment of the suspended pedal 184b, the pedal 184b may move in all six of the aforementioned degrees of freedom and may have an adjustment envelope 186 in the forward/backward directions of about 500 mm to about 900 mm, in the up/down directions in the range of about −200 mm to about −600 mm, in the left/right directions in the range of about −400 mm to about +400 mm, in the pitch direction in the range of about −90° to about +90°, in the yaw range of about −40° to about +40° and in the roll direction of about −20° to about +20° if the foot control module 122 is mounted so that the pedal 184b is disposed near the left hand side of a seated evaluator and a roll range of about +20° to about −20° if the foot control module 122 is mounted so that the pedal 184b is disposed near the right hand side of the seated evaluator. The pitch, yaw and roll ranges are measured from a vertical orientation.

In an embodiment, the foot control module 122 may also comprise a pedal adjuster 194. The pedal adjuster 194 may be mounted to the pedal 184 and may be directly or indirectly manipulated by a user to adjust the travel of the pedal 184, the effort or force required to move the pedal 184, the number of stops 188 for the pedal 184 and the number of intermediate detents 190 between pedal stops 188. Such an adjuster may be, but is not limited to, buttons, switches, dials or the like.

In an embodiment, the pedal adjustor 194 may adjust the travel of the pedal 184 by increasing or decreasing the amount of distance that the pedal 184 is permitted move. In another embodiment, an evaluator may also adjust the amount of travel between pedal stops 188 and detents 190. The evaluator may also be able to adjust the effort or the amount of force required for a user to move the pedal 184. For example, the evaluator may change the amount of effort to move the pedal 184 from about 30 N to about 450 N. The evaluator may also adjust the number of pedal stops 188 and pedal detents 190.

In some embodiments utilizing the suspended pedal 184b, the foot control module 122 may also include a foot peg 196. In some embodiments, the foot peg 196 may be relatively lightweight and may have a weight in the range of about 0.1 kg to about 5 kg. The foot peg 196 may be mounted to the bed 110. The foot peg 196 may be configured to move in tandem with the pedal 184. The foot peg 196 may also be configured to be independently adjustable with respect to the suspended pedal 184. The foot peg 196 may be moveable in multiple degrees of freedom. The foot peg 196 may be configured to be adjustable (move) in any one of or any combination of the following degrees of freedom: forward/backward, up/down, right/left, pitch, yaw or roll. Such movement helps define the contours of the adjustment envelope 198 of the foot peg 196. FIG. 8 illustrates an exemplary embodiment of the adjustment envelope 198 of the foot peg 196.

The adjustment envelope 198 of the foot peg 196 is located relative to a reference point and is the three dimensional space within which the foot control module 122 is able to position the centroid of the foot peg. The reference point may be the centroid of the foot pedal 184b.

In one embodiment, the foot peg 196 may move in all six of the aforementioned degrees of freedom and may have a foot peg adjustment envelope 198 in the forward/backward directions of about 0 mm to about 250 mm, in the up/down directions in the range of about 0 mm to about 150 mm, in the left/right directions in the range of about +100 mm to about −100 mm, in the pitch direction in the range of about +40° to about −40°, in the yaw range of about −40° to about +40° and in the roll direction of about −40° to about +40°.

FIG. 2 illustrates one exemplary embodiment of the steering module 120. The steering module 120 may be relatively lightweight and yet be configured to be able to "hold a position" during ride simulation in a lab setting, a CAVE or on a motion platform 132 of a dynamic ride simulator 134 (during dynamic ride simulation). In one embodiment, the steering module 120 may hold a position within a range of about −6 g to about 6 g, plus or minus 10% deviation. In another embodiment, the steering module 120 may hold a position within a range of about −3 g to about 3 g, plus or minus 10% deviation. In yet another embodiment, the steering module 120 may hold a position within a range of g-force of about −2 g to about 2 g, plus or minus 10% deviation. In another embodiment, the steering module 120 may hold a position in a range of g-force of about −1 g to about 1 g, plus or minus 10% deviation.

The steering module 120 may comprise a steering member 202. The steering member 202 may be wheel shaped or otherwise appropriately shaped. The steering member 202 may be mounted to the bed 110 by a steering tower 204 or other appropriate mount. In some embodiments, the steering member 202 may weigh between about 1 kg and about 10 kg.

The steering module 202 may be configured to be adjustable (move) in any one of, or any combination of, the following degrees of freedom: forward/backward, up/down, right/left, pitch, yaw or roll. Such movement helps define the contours of the adjustment envelope 208 of the steering module 120. The steering adjustment envelope 208 may be located relative to a reference point and is the three dimensional space within which the steering module 120 is able to position the centroid of the steering member 202. In one embodiment, the reference point may be the SIP 142. FIG. 6 illustrates one exemplary embodiment of the steering adjustment envelope 208.

In one embodiment, the steering module 120 may be moveable in all six of the aforementioned degrees of freedom and may have a steering adjustment envelope 208 in the forward/backward directions of about 300 mm to about 900 mm, in the up/down directions in the range of about 0 mm to about 500 mm, in the left/right directions in the range of about +500 mm to about −500 mm, in the pitch direction in the range of about +90° to about −90°, and in the yaw range of about −40° to about +40°.

The steering module 120 may also include steering stops 212. The steering stop 212 may position or hold the steering member 202 such that the steering member 202 may be released when force is applied. In one embodiment the steering stop 212 may be a mechanical component that utilizes spring force. In another embodiment, the steering stop 212 may be a resistive actuator controlled electronically by a controller.

In some embodiments, the steering module 120 may also include a steering adjuster 210 connected to the steering member 202. Such an adjuster may be, but is not limited to, buttons, switches, dials or the like. The steering adjuster 210 may be directly or indirectly manipulated by a user to adjust the travel of the steering member 202, the effort or force required to move the steering member 202 and the number of steering stops 212 for the steering member 202. In an embodiment, the steering adjuster 210 may adjust the travel of the steering member 202 by increasing or decreasing the amount of distance that the steering member 202 is permitted to move. In another embodiment, an evaluator may also adjust the amount of travel between steering stops 212. The evaluator may also be able to adjust the effort or the amount of force required for a user to move the steering member 202. For example, the evaluator may change the amount of effort to move the steering member 202 from about 15 N to about 100 N. The evaluator may also adjust the number of steering stops 212 for the steering member 202.

FIG. 2 illustrates one embodiment of the display module 124. The display module 124 is configured to be able to "hold a position" during ride simulation in a lab setting, a CAVE or on a motion platform 132 of a dynamic ride simulator 134 (during dynamic ride simulation). In one embodiment, the display module 124 may hold a position within a range of about −6 g to about 6 g, plus or minus 10% deviation. In another embodiment, the display module 124 may hold a position within a range of about −3 g to about 3 g, plus or minus 10% deviation. In yet another embodiment, the display module 124 may hold a position within a range of g-force of about −2 g to about 2 g, plus or minus 10% deviation. In another embodiment, the display module 124 may hold a position in a range of g-force of about −1 g to about 1 g, plus or minus 10% deviation.

The display module 124 may comprise a display 214. In one embodiment the display may be relatively light weight with a weight in the range of about 0.5 kg to about 5 kg. The display 214 may include a visual representation of information. The display 214 may be an electronic display and may include but is not limited to LEDs, computer generated graphics, liquid crystal displays, and plasma displays. In alternative embodiments, the display 214 may be a mechanical display and may include but is not limited to gauges, meters, and fluid levels. The display 214 may be mounted to the bed 110 by a tower 216 or other appropriate mount.

The display 214 may be configured to be adjustable (move) in any one of, or any combination of, the following degrees of freedom: forward/backward, up/down, right/left, pitch, yaw or roll. Such movement helps define the contours of the adjustment envelope 218 of the display 214. The adjustment envelope 218 of the display 214 may be located relative to a reference point and is the three dimensional space within which the display module 124 is able to position the centroid of the display 214. In one embodiment, the reference point may be the SIP 142. FIG. 8 illustrates one exemplary adjustment envelope 218 for the display 214.

In one embodiment, the display module may be moveable in all six of the aforementioned degrees of freedom and may have an adjustment envelope in the forward/backward directions of about −1000 mm to about +1000 mm, in the up/down directions in the range of about −600 mm to about +900 mm, in the left/right directions in the range of about −700 mm to about +700 mm, in the pitch direction in the range of about 0° to about 360°, in the yaw range of about 0° to about 360°, and in the roll direction of about 0° to about 360°.

The display module 124 may also include display stops 220 and display detents 222 between each display stop 220. The display stop 220 may position or hold the display 214 such that the display 214 may be released when force is applied. Similar to a stop 220, a display detent 222 may also position or hold the display 214 such that the display 214 may be released when force is applied. However, with a display detent 222 less force may be required than that to overcome a display stop 220. In one embodiment the display stop 220 or display detent 222 may be a mechanical component that utilizes spring force. In another embodiment, the display stop 220 or display detent 222 may be a resistive actuator controlled electronically by a controller.

In an embodiment, the display module 124 may also comprise a display adjuster 224. The display adjuster 224 may be connected to the display 214 and may be directly or indirectly manipulated by a user to adjust the travel of the display 214, the effort or force required to move the display 214, the number of stops 220 for the display 214 and the number of intermediate detents 222 between display stops 220. Such an adjuster may be, but is not limited to, buttons, switches, dials or the like.

In an embodiment, the display adjustor 224 may adjust the travel of the display 214 by increasing or decreasing the amount of distance that the display 214 is permitted move. In another embodiment, an evaluator may also adjust the amount of travel between display stops 220 and detents 222. The evaluator may also be able to adjust the effort or the amount of force required for a user to move the display 214. For example, the evaluator may change the amount of effort to move the display 214 from about 2 N to about 20 N. The evaluator may also adjust the number of display stops 220 and display detents 222.

The controller 104 may include a processor 226 and a memory component 106. The controller 104 may be operably connected to each OIM 114 and the user interface 108. The controller 104 may also be operably connected to the seat module 112. The processor 226 may be a microprocessor or other processor as known in the art. The processor 226 may execute instructions and generate control signals for moving the seat module 112 and/or OIMs 114. Such instructions may be read into or incorporated into a computer readable medium, such as the memory component 106 or provided external to the processor. In alternative embodiments, hard wired circuitry may be used in place of, or in combination with, software instructions to implement a control method.

The term "computer readable medium" as used herein refers to any non-transitory medium or combination of media that participates in providing instructions to the processor for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor can read.

The controller 104 is not limited to one processor 226 and memory component 106. The controller 104 may be several processors 226 and memory components 106. The processor 226 and/or the memory component 106 may be located on the bed 110 or may be located remotely from the bed 110.

In one embodiment the controller 104 may receive a movement command from the remote operator interface 108, or the user interface 109 disposed on the test buck 102, to change the position of an OIM 114 or the seat 136 of the seat module 112. The movement command input may be in the form of an absolute position relative to a reference point, such as the SIP 142, or an incremental command in one or more of the six degrees of freedom of movement discussed herein. Alternatively, the movement command may be a command specifying a new position for the OIM 114 or seat 136. The controller 104 may also receive adjustment commands from the remote operator interface 108 or the user interface 109 to adjust the travel, effort, number of stops and number of detents between stops for the applicable parts of an OIM 114.

In response to commands to change position that are received from the remote operator interface 108 or the user interface 109, the controller 104 may be configured to generate and transmit a movement signal to the applicable OIM 114 or seat module 112 that causes such OIM 114 or seat 136 to change position. In response to commands that are received from the remote operator interface 108 or the user interface 109 to adjust the travel, effort, number of stops and number of detents between stops for an OIM 114, the controller 104 may be configured to generate and transmit an adjustment signal to the applicable OIM 114 that causes an adjustment to travel, effort, number of stops and number of detents between stops.

The OIM 114 and the seat module 112 each have a locked state and an unlocked state. In some embodiments, the locked state may be engaged by input into the remote operator interface 108. When in the locked state, the OIM 114 and seat module 112 do not accept movement or adjustment signals from the controller 104 and do not allow the evaluator to physically move or adjust the OIM 114. The test buck, in some embodiments, may include a safety circuit 228 that can be activated by the evaluator to engage the locked state in case of an emergency.

The sensors 111 disposed on the test buck 102 may provide data to the controller 104 as to the current position of the OIM 114 and/or seat 136 and, after a change in position, the new position of the OIM 114 and/or seat 136. This data may be provided by the sensors 111 regardless of whether the current or new position occurred as a result of a command from a remote operator interface 108, a user interface 109 disposed on the test buck 109, or an evaluator physically repositioning the OIM 114 or seat 136. Sensors 111 may also provide information as to the resistive force an OIM 114 encounters during movement. In some embodiments, if the OIM 114 encounters a resistive force of about 20N or more, the controller will transmit a signal to stop movement of the OIM 114.

INDUSTRIAL APPLICABILITY

Figure 9:
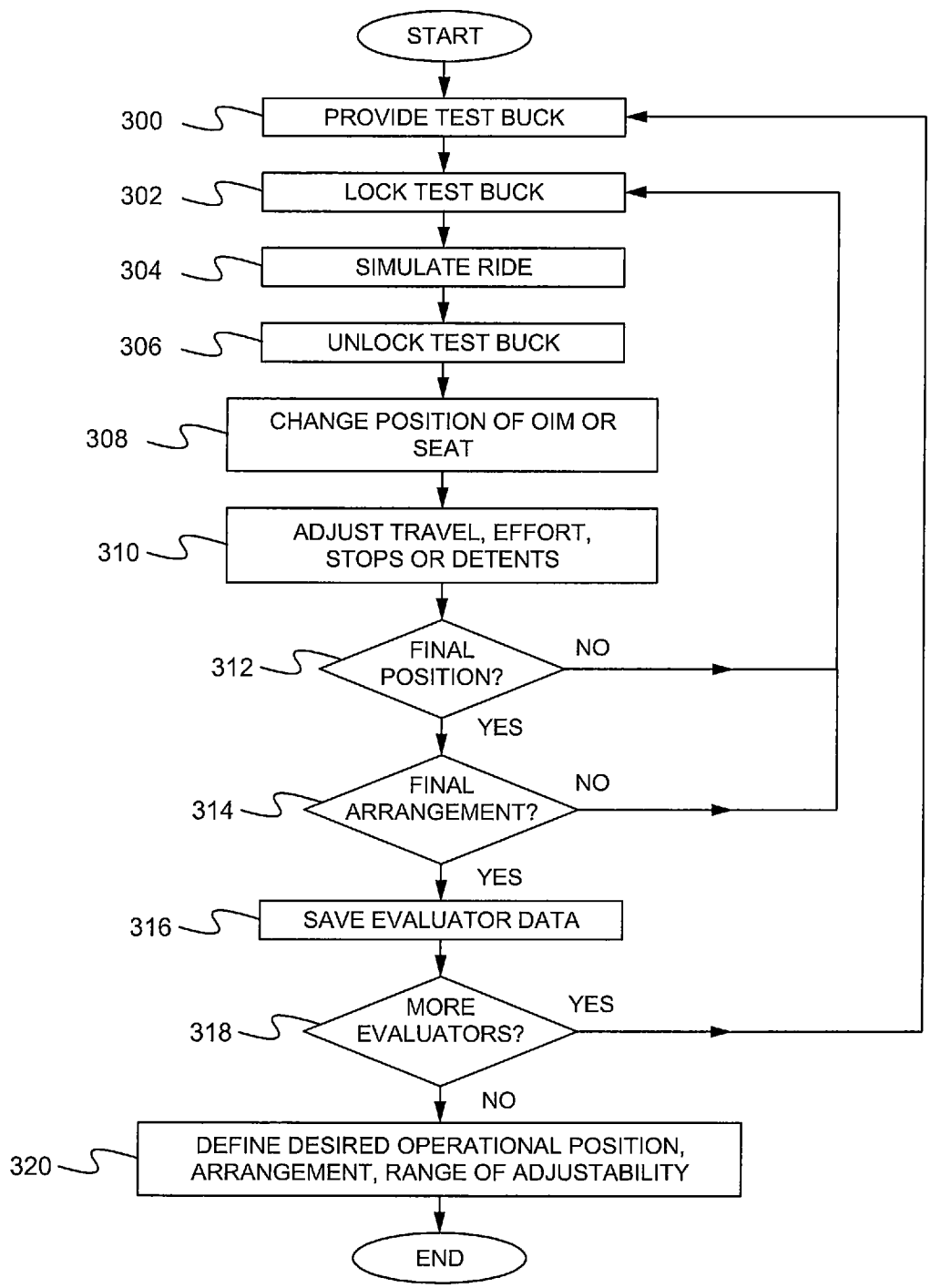
FIG. 9 is flowchart illustrating exemplary steps of optimizing the position of an OIM in accordance with the teachings of this disclosure.

Referring now to FIG. 9, an exemplary flowchart is illustrated showing sample steps which may be followed in optimizing the position of an OIM 114 or seat 136 within a work machine cab. Step 300 of the method includes providing a test buck 102. The test buck 102 may be portable and may include a bed 110, a seat module 112 mounted to the bed 110 and a first OIM 114 disposed in an initial position. The test buck 102 may be mounted to the floor of a lab, a virtual reality environment, such as a CAVE or similar environment, or mounted to the platform 132 of a dynamic ride simulator 134.

The test buck may be provided with each OIM 114 or seat module in its home state. The initial position of the OIM 114 or the seat module 112 during an evaluation may be referred to as the "home state" of the OIM 114 or the seat module 112. The home state position for an OIM 114 or the seat module 112 (if the seat 136 is moveable) may be defined by the position or orientation of a component of the OIM 114 or seat module (or a point, such as the centroid, of the component of the OIM 114 or seat module) relative to a reference point. In some embodiments, the reference point may be, but is not limited to, the SIP 142.

Figure 11:
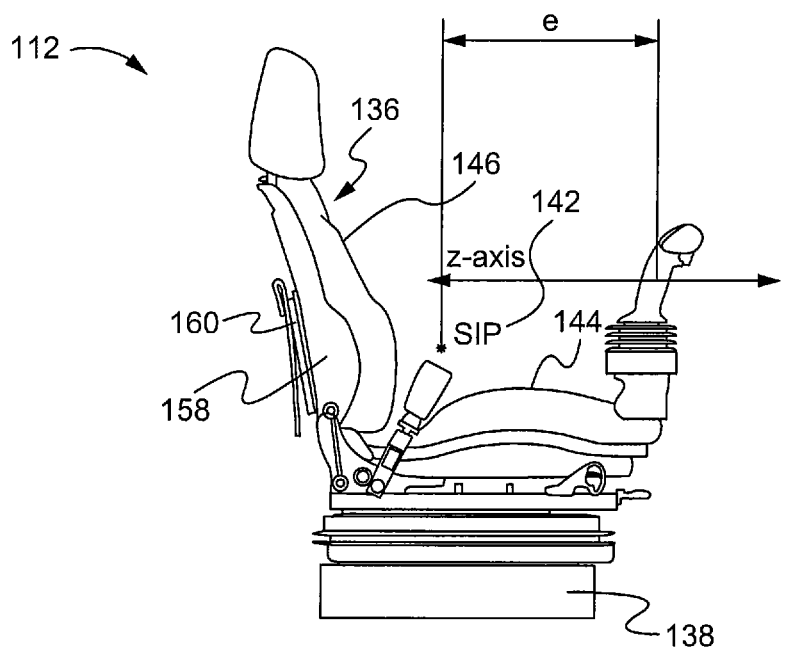
FIG. 11 is a side view of an embodiment of the seat module and the hand control apparatus of FIG. 10.

One exemplary home state is shown in FIGS. 10-11. FIGS. 10-11 illustrate the upper control module 116 in an exemplary home state. As can be seen in FIGS. 10-11, the HIP 174 of the handle 164 may be located a distance "c" above the horizontal x-axis, about a distance of "d" from the SIP 142 along the x-axis, and a distance "e" (see FIG. 11) from the SIP 142 along a z-axis perpendicular to the x and y axes. In one embodiment, the distance "c" is about 140 mm above the horizontal x-axis, and the distance "d" is about 340 mm from the SIP 142 along the x-axis, and the distance "e" is about 370 mm from the SIP 142 along a z-axis perpendicular to the x and y axes. A portion of the upper control module 116 has been removed in the illustration shown in FIGS. 10-11 to better illustrate the aforementioned description. FIG. 10 illustrates both a right hand HIP and a left hand HIP.

Step 302 of the method includes placing the test buck 102 in a locked state. Prior to starting a ride simulation, the OIM 114 and the seat module 112 (if the seat 136 is moveable) may be placed in a locked state. The locked state may occur as a result of input into the remote operator interface 108 or the user interface 109. A locked state is a functional state that holds an OIM 114 or seat module 112 in a given position. While in this state, the OIM 114 or seat module 114 does not accept movement commands from the controller or physical movement by the evaluator. A remote operator is a person who remotely (from the test buck) manipulates the location and orientation of the moveable components of the OIM 114 and/or seat module via computer software commands.

The method further includes step 304, simulating a ride in a machine while an evaluator is disposed in the seat 136 of the seat module 112 and is using or operating one or more OIMs 114. An evaluator is the subject of ergonomic evaluations who sits in the ergonomic test buck seat 136 during a ride simulation and manipulates the OIM(s) 114 during the ride simulation.

In step 306, the OIM(s) 114 and the seat module 112 (if the seat 136 is moveable) may be placed in an unlocked state after the ride simulation. The method further includes moving the OIM 114 to a next position, different from the current position (step 308). Alternatively, the method may include moving the seat 136 to a next (subsequent) position, different from the current position. Change of position may be input as an absolute position relative to a global reference point (such as the SIP), or an incremental change in any of the six degrees of freedom.

In one embodiment of the method, the evaluator may communicate, verbally or otherwise, to a remote operator a change in position for an OIM 114 or the seat 136 of the seat module 112. The remote operator may input, via a remote operator interface 108, instructions to the controller 102 to cause the OIM 114 or seat 136 to change from the current position to the next position. Alternatively, the evaluator may input into the controller 104, via a user interface 109, instructions to cause the OIM 114 or seat 136 to change from the current position to the next position. In some embodiments, the evaluator may physically push, pull or otherwise change the position, location and orientation of the OIM 114 or seat 136.

The method may also include adjusting the travel, effort, stops or detent of an OIM 114 (step 310). This step may be skipped in some embodiments or if there is no desired adjustment to be made. Similar to step 308, in one embodiment of the method, the evaluator may communicate, verbally or otherwise, to a remote operator adjustment for an OIM 114. The remote operator may input, via a remote operator interface 108, instructions to the controller 102 to adjust one or more of the following from a first arrangement to a second arrangement: travel, effort, stops or detents of an OIM 114. Alternatively, the evaluator may input into the controller, via a user interface 109, instructions to adjust one or more of the following from a first arrangement to a second arrangement: travel, effort, stops or detents of an OIM 114. In some embodiments, the evaluator may physically adjust through buttons, switches, dials or the like, the travel, effort, stops or detents of an OIM 114.

Once changes have been made, the method may repeat steps 302-310 until in step 312 there are no more changes of position to the OIM 114 (or seat 136) and in step 314 there are no more changes to the OIM 114 arrangement (travel, effort, number of stops or detents). In some embodiments, but not all, all changes made to the OIM and/or seat module are saved to the memory component 106. The last position of the OIM(s) 114 and seat 136 in the iterations conducted with a given evaluator is the evaluator final position and the last arrangement is the evaluator final arrangement. The evaluator final position may be defined by the position or location and orientation of a component of the OIM 114 or seat module relative to a reference point. In some embodiments, the reference point may be, but is not limited to, the SIP 142. In some embodiments, the evaluator final position may not be defined relative to a reference point but may instead be an absolute position.

Once the evaluator final position and evaluator final arrangement is reached for an evaluator, the method progresses to step 316, saving to the memory component 106 a set of evaluator data including, but not limited to, the evaluator final position and evaluator final arrangement for one or more OIM(s) 114 evaluated by the evaluator, and, if applicable, for the seat module 112. In an embodiment, the intermediate positions between the home state and the evaluator final position and evaluator final arrangement of an OIM may also be saved to the memory component 106.

If there are additional evaluators in step 318, the method may further include repeating steps 300-316 for each of the plurality of other evaluators. Once a set of evaluator data (evaluator final position and/or evaluator final arrangement, and/or intermediate position information) has been reached for each evaluator in the test sample, the method in step 320 may include generating a set of final test positions and/or final test arrangements for each OIM 114 evaluated. The set of final test positions includes the evaluator final position for each of the plurality of evaluators. Similarly, the set of final test arrangements may include the evaluator final arrangement for each of the plurality of evaluators.

Step 320 may further include defining a desired operational position for the OIM 114 or seat module 112 based on the set of final test position data for the plurality of evaluators. The desired operational position for an OIM 114 (or seat module 112) is the position in which the components of the OIM 114 (or seat module 112) are to be placed prior to use in a work machine. For example, a desired operational position for an OIM 114 may be the average of the set of final test positions. In another embodiment, the desired operational position for the OIM 114 may be the average of the set of final test positions after evaluator final positions that exceed a threshold deviation are removed from the set of final test positions.

The desired operational position is similar to the concept of the home position during testing by the evaluator. Such a desired operational position may be referenced in terms of the location and orientation of one or more components of the OIM 114 (or seat module 112) in relation to a reference point. The reference point may be, but is not limited to, the SIP 142. For example, in one embodiment the desired operational position of the upper control module may be given in terms of the location and/or orientation of the handle (and/or a point on the handle) relative to the SIP 142.

Step 320 may also include defining a desired arrangement (amount of travel, effort, number of stops or detents) for the OIM 114 or seat module 112 based on the set of final test arrangement data for the plurality of evaluators. The desired operational arrangement is the travel, effort, number of stops or detents for a given OIM 114 to be provided in a work machine. In some embodiments, this step 320 may also include defining a desired operational range of adjustability (desired adjustment envelope) for an OIM 114 (and/or seat module 112) based at least in part on the stored range of movements of the OIM 114 or seat module 112 for the plurality of evaluators during testing. The desired operational range of adjustability may be considered the range of movement (adjustability) from the desired operational position for each OIM 114 (and/or seat module 112).

In one embodiment, at least one evaluator final position in the set of final test positions is different from the home state position of an OIM 114 by four degrees of freedom. In another embodiment, at least one evaluator final position in the set of final test positions is different from the home state position by five degrees of freedom. In yet another embodiment, at least one evaluator final position in the set of final test positions is different from the home state position by six degrees of freedom. In some embodiments, at least one evaluator final arrangement in the set of evaluator test arrangements may be different from the initial arrangement at the start of testing.

The controller may output a data file and/or report based on the data file that includes, at least some of the following: identification of the OIM 114, each evaluator's final position data, the set of evaluator final test positions (x, y, z, pitch, yaw and roll), the desired operational position (x, y, z, pitch, yaw and roll), the effort, the coordinates of the HIP 174 and SIP 142 or other reference point, the range of adjustments made in each degree of freedom by an evaluator and/or the plurality of evaluators, the operational range of adjustability, the joystick handle type (if applicable), the linear distance of the joystick pivot point from the HIP 174, each evaluator's final arrangement data, the set of final test arrangements, the desired operational arrangement data. The report may be output to any appropriate output device, for example, the output could be provided to the display of the remote user interface 108, a printer, or the like.

Also disclosed is a computer program product, comprising a non-transitory computer usable medium having a computer readable program code embodied therein, the computer readable program code adapted to be executed to implement a method for optimizing the position of OIMs, the method comprising providing a bed, a seat module mounted to the bed, and a first OIM mounted to the bed and disposed in a home position; simulating a machine operation while one of a plurality of operators is disposed in the seat module and is operating the first OIM; moving the first OIM to a final position in response to adjustment input from the operator; generating a set of final test positions for the OIM by performing the simulating and moving steps for each of the plurality of operators; and defining a range of adjustability and an operational position for the OIM based on the set of final test positions, wherein at least one final test position in the set of final test positions is different from the home position by four degrees of freedom.

The test buck 102 may include a circuit 230 for the evaluator to activate to lock the test buck 102 in case of an emergency. In addition, the test buck system may be configured to stop movement of an OIM 114 or seat module 112 if a resistive force in the range of about 5N to about 20N is encountered during controller movement of such OIM 114 or seat module 114.

The features disclosed herein may be particularly beneficial to for testing the operator configurations of wheel loaders and other earth moving, construction, mining or material handling vehicles before the build of machine prototypes is completed. The portability and light weight of the test buck allows it to be utilized to test operator control placement and configurations in a variety of test environments, including dynamic environments. Such testing may be done iteratively with a plurality of operators. Using the test buck, ergonomically improved controls and operator friendly placement of such controls may be achieved without incurring the historically high costs of iteratively testing an operator control configuration and then moving vehicle components to allow for new operator control configurations and placements.

What is claimed is:

1. A test buck system comprising:
   a test buck, the test buck including:
      a portable bed;
      a seat module mounted to the bed; and
      a first OIM disposed on the bed in a home position, at least a portion of the first OIM selectively moveable in four degrees of freedom; and
   a controller electrically connected to the first OIM of the test buck, the controller configured to:
      for each of a plurality of operators disposed in the seat module and operating the first OIM, simulate a machine operation;
      for each of the plurality of operators, move at least the portion of the first OIM to a final position in response to received operator input;
      generate for the plurality of operators a set of final test positions for at least the portion of the first OIM; and
      define a desired operational range of adjustability and a desired operational position for at least the portion of the first OIM based on the set of final test positions, wherein at least one final test position in the set of final test positions is different from the home position by four degrees of freedom.

2. The test buck system of claim 1, wherein the bed is configured to be removeably mounted to a platform of a dynamic ride simulator.

3. The test buck system of claim 2, further including a dynamic ride simulator having a platform upon which the test buck is mounted.

4. The test buck system of claim 3, wherein the first OIM is an upper control module, the upper control module including a joystick.

5. The test buck system of claim 1, further comprising a second OIM mounted to the bed, the second OIM different from the first OIM.

6. The test buck system of claim 1, wherein the first OIM is a foot control module, the foot control module including a floor mounted pedal.

7. The test buck system of claim 1, further comprising a tower secured to the bed, wherein the first OIM is a foot control module including a suspended pedal mounted to the tower.

8. The test buck system of claim 7, in which the foot control module further includes a foot peg.

9. The test buck system of claim 1, wherein the first OIM is a steering module.

10. The test buck system of claim 1, wherein the first OIM is a display module.

11. The test buck system of claim 1, wherein at least a portion of the first OIM is selectively moveable in six degrees of freedom.

12. The test buck system of claim 1, wherein the received operator input designates incremental movement of at least the portion of the first OIM.

13. A test buck system comprising:
a bed configured to be removeably mounted to a test floor of a dynamic ride simulator;
a seat module mounted to the bed;
an OIM mounted to the bed, the OIM having a first portion; and
a controller electrically connected to the OIM, the controller configured to:
selectively move at least the first portion of the OIM in the range of four to six degrees of freedom; and
receive a move command to move the first portion of the OIM and to transmit a movement signal to the OIM based on the move command, wherein the seat module has an SIP and the move command is based on input that designates a position relative to the SIP.

14. The test buck system of claim 13, further comprising a remote operator interface, wherein the move command is received by the controller from the remote operator interface.

15. The test buck system of claim 13, further comprising a user interface disposed on the bed, wherein the move command is received by the controller from the user interface.

16. A method of determining a desired operational position of at least one OIM, the method comprising:
simulating a machine operation while one of a plurality of operators is disposed in a seat module mounted to a bed and is operating a first OIM mounted to the bed and disposed in a home position;
moving the first OIM to a final position in response to input from the operator;
generating a set of final test positions for the OIM by performing the simulating and moving steps for each of the plurality of operators; and
defining a desired operational range of adjustability and a desired operational position for the OIM based on the set of final test positions, wherein at least one final test position in the set of final test positions is different from the home position by four degrees of freedom.

17. The method claim 16, wherein the first OIM includes a joystick.

18. A method of claim 16, further comprising:
providing a second OIM mounted to the bed and disposed in a second home position; and
moving a second OIM to a second final position in response to input from the operator, wherein the second final position is different from the second home position by four degrees of freedom.

* * * * *